United States Patent
Zedell et al.

(10) Patent No.: US 7,541,774 B2
(45) Date of Patent: Jun. 2, 2009

(54) BATTERY CHARGER HAVING OBLIQUE COUPLING RAILS

(75) Inventors: Karl Zedell, Alpharetta, GA (US); Yoshitaka Matsuzawa, Atlanta, GA (US); Mark C. Taraboulos, Chamblee, GA (US)

(73) Assignee: Motorola, Inc., Schaumburg, IL (US)

( * ) Notice: Subject to any disclaimer, the term of this patent is extended or adjusted under 35 U.S.C. 154(b) by 230 days.

(21) Appl. No.: 11/117,798

(22) Filed: Apr. 30, 2005

(65) Prior Publication Data
US 2006/0244413 A1    Nov. 2, 2006

(51) Int. Cl.
*H02J 7/00*    (2006.01)
(52) U.S. Cl. ............ 320/114; 320/110; 320/112; 320/113
(58) Field of Classification Search ........... 320/106, 320/108, 112, 114, 115; 429/96–100
See application file for complete search history.

(56) References Cited

U.S. PATENT DOCUMENTS

| | | | | |
|---|---|---|---|---|
| 3,601,679 A | * | 8/1971 | Braun et al. | 320/114 |
| 3,999,110 A | * | 12/1976 | Ramstrom et al. | 320/112 |
| 5,059,885 A | * | 10/1991 | Weiss et al. | 320/115 |
| 5,122,721 A | * | 6/1992 | Okada et al. | 320/111 |
| 5,148,094 A | * | 9/1992 | Parks et al. | 320/110 |
| 5,659,236 A | | 8/1997 | Hahn | |
| 5,729,115 A | * | 3/1998 | Wakefield | 320/110 |
| D398,605 S | | 9/1998 | Murray et al. | |
| 5,942,877 A | * | 8/1999 | Nishimura | 320/112 |
| 6,014,011 A | * | 1/2000 | DeFelice et al. | 320/114 |
| 6,044,281 A | * | 3/2000 | Shirai | 455/573 |
| 6,049,192 A | * | 4/2000 | Kfoury et al. | 320/113 |
| 6,265,845 B1 | * | 7/2001 | Bo et al. | 320/113 |
| 6,400,969 B1 | * | 6/2002 | Yamashita et al. | 455/573 |
| 6,509,715 B1 | * | 1/2003 | LaRue | 320/107 |
| 6,525,511 B2 | * | 2/2003 | Kubale et al. | 320/114 |
| 6,534,953 B2 | * | 3/2003 | Shirakawa | 320/114 |
| 6,562,509 B1 | * | 5/2003 | Eggert | 429/96 |
| 6,597,151 B1 | * | 7/2003 | Price et al. | 320/105 |
| 6,789,734 B1 | * | 9/2004 | Tu | 235/441 |
| 6,950,320 B2 | * | 9/2005 | Shin | 363/21.15 |
| 6,956,734 B2 | * | 10/2005 | Shin et al. | 361/683 |
| 6,965,214 B2 | * | 11/2005 | Kubale et al. | 320/114 |
| 7,064,519 B2 | * | 6/2006 | Ito | 320/112 |
| 2003/0004690 A1 | | 1/2003 | Maeda et al. | |

* cited by examiner

*Primary Examiner*—Akm E Ullah
*Assistant Examiner*—Arun Williams
(74) *Attorney, Agent, or Firm*—Philip H. Burrus, IV; Hisashi D. Watanabe; Anthony P. Curtis (57) ABSTRACT

A battery charger with an improved battery retention system is provided. The battery charger includes at least one pocket having a bottom and sidewalls. A pair of battery engagement rails, or coupling rails, extends outward into the pocket at an angle that is non-orthogonal with the sidewalls. These non-orthogonal rails, which may include embedded electrical contacts, mate with non-orthogonal female slots in a battery pack housing. The non-orthogonal angle prevents lateral forces applied to the battery from causing intermittent electrical connections between the battery pack and the charger. Additionally, the non-orthogonal angle of the rails allows batteries of various sizes to be inserted into the pocket while ensuring a consistent and reliable electrical connection.

20 Claims, 9 Drawing Sheets

*FIG. 1*

PRIOR ART

FIG. 2

PRIOR ART

FIG. 3

PRIOR ART

FIG. 10

BATTERY CHARGER HAVING OBLIQUE COUPLING RAILS

BACKGROUND

1. Technical Field

This invention relates generally to desktop chargers for rechargeable battery packs, and more specifically to a charger having a pocket with oblique coupling rails to retain a battery pack within the pocket for charging.

2. Background Art

Portable electronic devices, like two-way radios and mobile phones for example, owe their portability to rechargeable battery packs. Rechargeable battery packs conveniently supply power to these portable devices without the need for wires, plugs or electrical outlets. In other words, when using a mobile device with a rechargeable battery pack, the user may take the device anywhere—at any time—without the need of being continually tethered to a wall outlet.

Rechargeable battery packs typically include one or more rechargeable electrochemical cells that store and deliver electrical energy. These electrochemical cells, which may be coupled to circuitry within the pack for charging or safety, must be recharged when depleted to remain functional. While charging may be accomplished by simply plugging a wired connector from a power supply into the battery pack, many people prefer the convenience of desktop chargers to facilitate the recharging process. When using a desktop charger, the user simply inserts either a spare rechargeable battery pack or electronic device itself into the charger. The charger then detects the presence of the battery or device and begins to recharge the cells in accordance with a predetermined charging procedure. Batteries and devices for industrial use, like the two-way radios used by fire and police departments, typically stand vertically within the charger when charging. The radio, standing in this vertical position, remains easily accessible and visible to the user.

Figure 1:
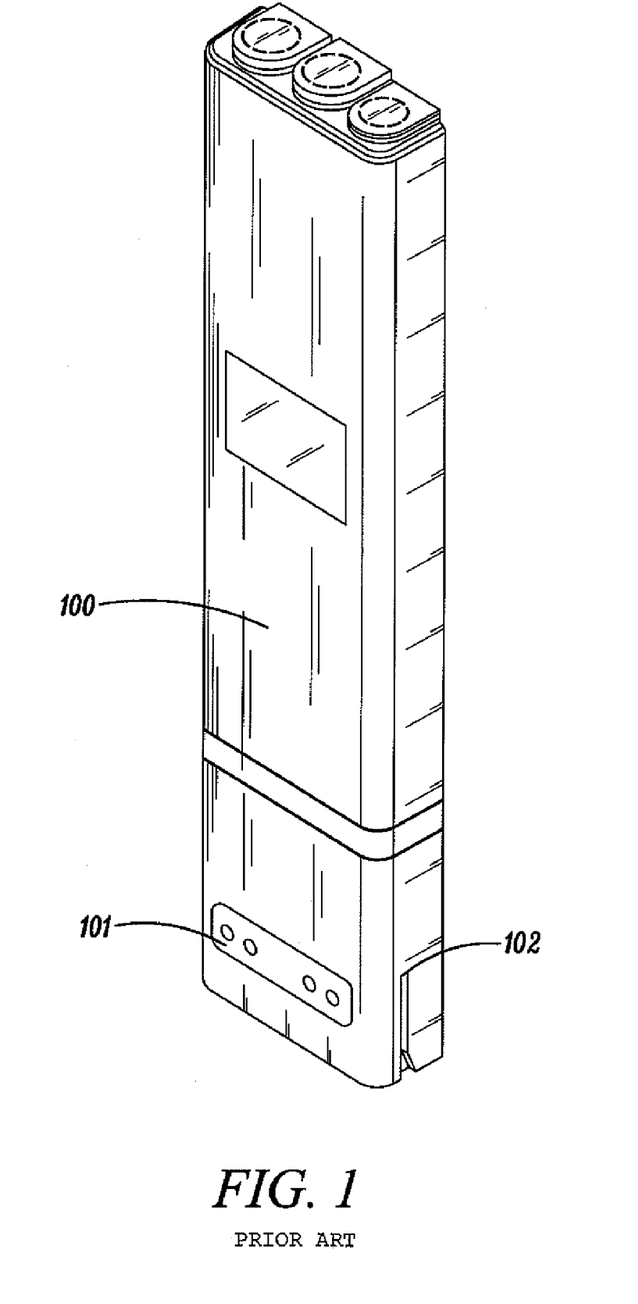
FIG. 1 illustrates a perspective view of a prior art battery pack.
Figure 2:
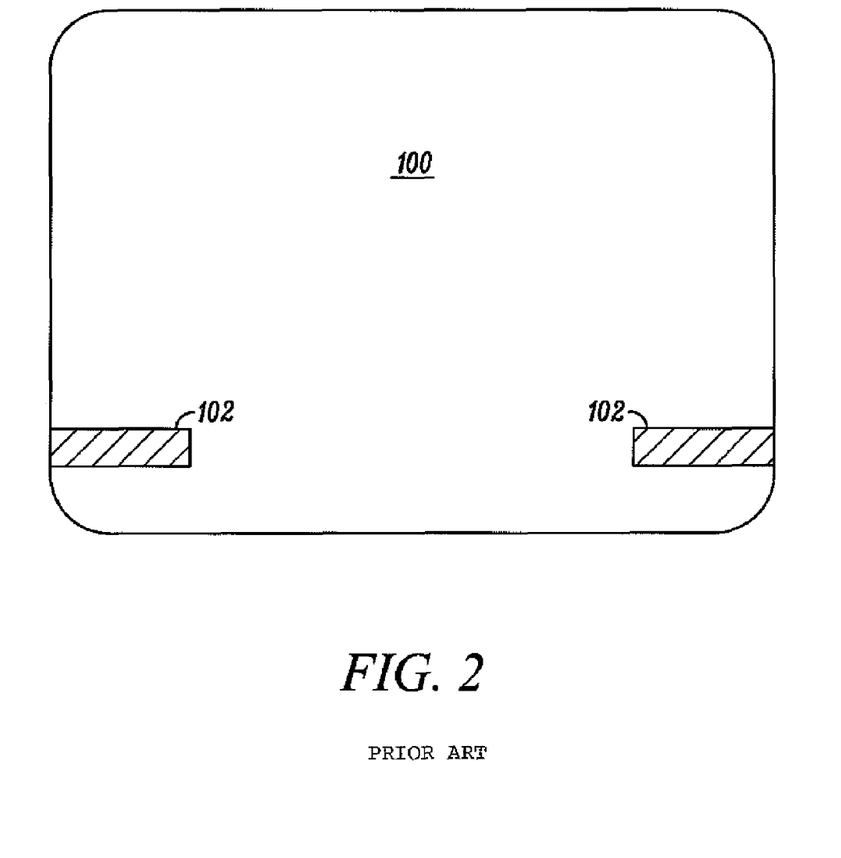
FIG. 2 illustrates a sectional view of a prior art battery pack.

To keep these large batteries from tipping over when charging, some manufacturers have incorporated battery retention systems into the chargers and their corresponding rechargeable battery packs. One example of a prior art battery retention system can be seen in FIGS. 1 and 2. FIG. 1 illustrates a perspective view of a battery pack 100 with such a prior art battery retention system, while FIG. 2 illustrates a cross-sectional view of the battery pack 100.

In this prior art battery retention system, the battery pack 100 is equipped with two channels 102, or slots, which run lengthwise along the battery pack housing on opposite sides of the battery pack 100. These channels 102 are perpendicular to the opposing sides upon which they are disposed.

A battery charger for this battery 100, which includes a pocket into which the battery 100 may be inserted for charging, would include two rails disposed on opposite sides of the pocket. The two rails are disposed in such a manner that when the battery pack 100 is inserted into the pocket, the two rails are aligned with the channels 102 of the battery pack 100. The alignment of the rails with the channels 102 ensures that electrical contacts disposed within the pocket of the charger couple securely and consistently with charging contacts 101 disposed on the battery pack 100.

The problem with this prior art battery retention system is that some batteries, often made for the same radio, are thicker than others. Consequently, for the fixed ribs and slots of this prior art retention system the pocket of the charger must be bigger than the smallest battery. Were this not the case, the largest battery could not be charged in the charger. This problem can be seen in FIG. 3.

Figure 3:
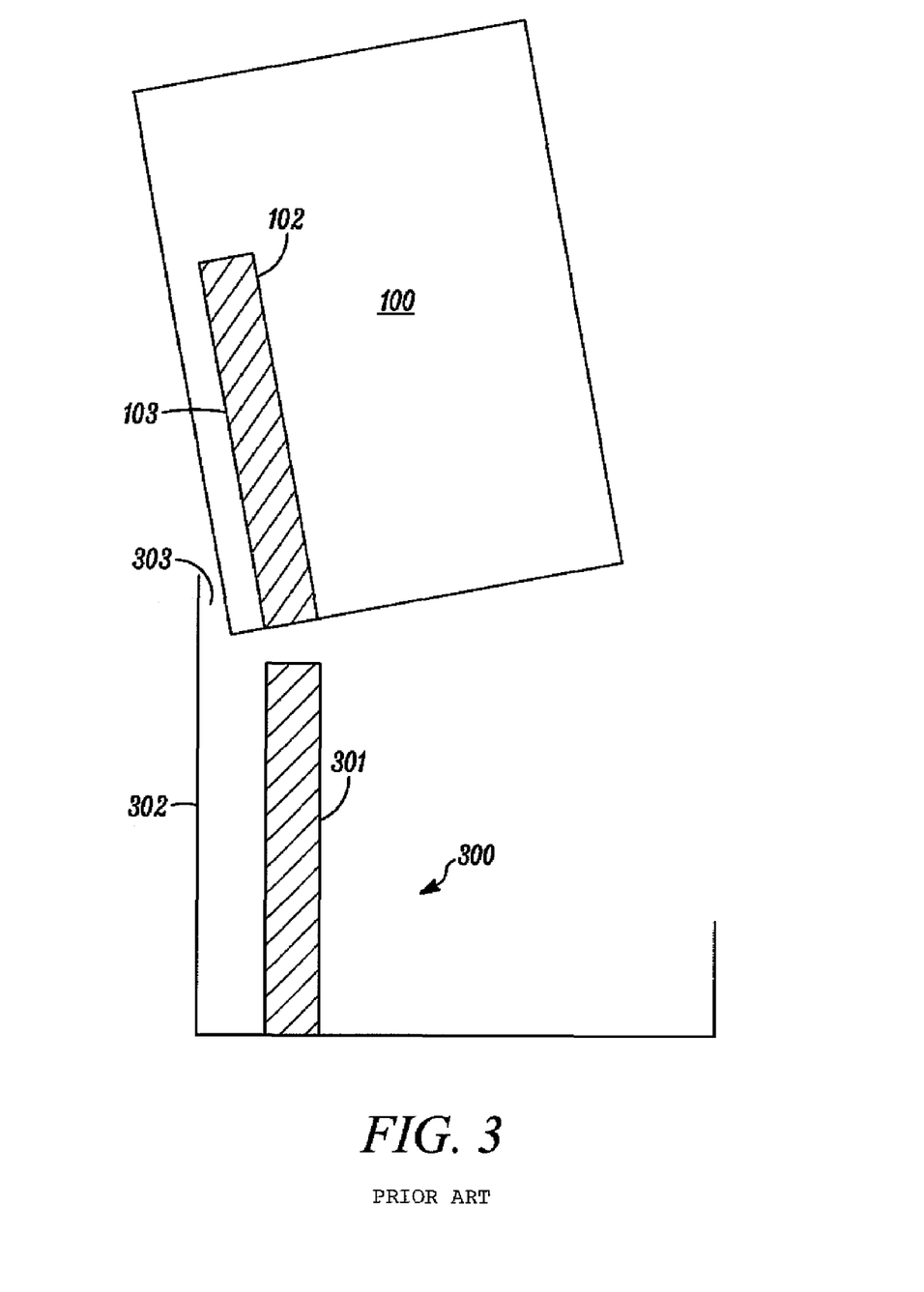
FIG. 3 illustrates a prior art battery pack and corresponding charger pocketing having a prior art battery retention system.

In FIG. 3 a charger pocket 300 having rails 301 and a back member 302 is shown. To accommodate multiple size batteries, the back member 302 must be sufficiently far from the rails 301 so as to accommodate the maximum thickness of the battery extending from the slots 102. As can be seen from FIG. 3, when a smaller battery 100 is inserted into the pocket 300, the slots 102 and rails 301 align as previously described. Since the back 103 of the battery 100 does not extend all the way to the back 302 of the charger pocket 300 when the slots 102 and rails 301 align, there will be a gap 303 between the back 103 of the battery 100 and the back 302 of the charger pocket 300. If the electrical contacts in the pocket extend through openings in the back 302 of the pocket 300, the gap 303 may become sufficiently large that the electrical contacts do not connect with the charger contacts of the battery pack 100. In such a scenario, reliable recharging of the battery pack 100 could be compromised.

A second problem arises when battery packs become smaller and smaller. To get the same amount of energy from a smaller battery pack, designers will reduce the thickness of the plastic exterior housing. In so doing, the thickness of the plastic exterior housing may be reduced to such an extent that slots can no longer accommodated. Since the charger-to-battery connection relies upon the rail-to-slot connection, designers must add extra plastic about the base edges of the battery pack just to accommodate the slots. These bumps of extra plastic material, often referred to as "rocket boosters", can make the overall appearance of the battery pack unsightly.

There is thus a need for an improved battery housing having a contact retention system that accommodates battery packs of varying thicknesses and does not require the use of extra material on the exterior of the battery pack housing.

DETAILED DESCRIPTION OF THE INVENTION

A preferred embodiment of the invention is now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on."

This invention provides a charger capable of supplying a voltage and current to a rechargeable battery pack for recharging. The charger includes at least one pocket for accommodating the rechargeable battery pack. The pocket includes a battery retention system to ensure a consistent and reliable connection between the rechargeable battery pack and electrical contacts disposed within the pocket.

The pocket includes a bottom member that supports the rechargeable battery when inserted into the pocket. The pocket also includes a plurality of sidewalls that extend vertically at an angle that is substantially perpendicular to the bottom of the pocket. In one preferred embodiment, the pocket includes three sidewalls. A fourth sidewall is omitted, thereby allowing greater visibility of the rechargeable battery and/or electronic device that is seated in the pocket.

The battery retention system includes a pair of battery engagement rails disposed along at least one of the sidewalls. The battery engagement rails, which may be located on either the same sidewall or on multiple sidewalls, are contiguous with the sidewall. The battery engagement rails extend outward from the sidewalls at an angle that is oblique with any of the sidewalls, preferably at an angle of between 30 and 60 degrees.

As noted above, electrical contacts are disposed within the pocket to recharge the battery pack. In one preferred embodiment of the invention, these electrical contacts are disposed within the battery engagement rails, thereby facilitating both a more reliable electrical connection to the battery pack, as well as a more aesthetically pleasing pocket design. Electrical circuitry, disposed within the charger, is connected to the electrical contacts and may ramp, step, taper or otherwise modulate the voltage and current to properly charge the battery pack.

Figure 4:
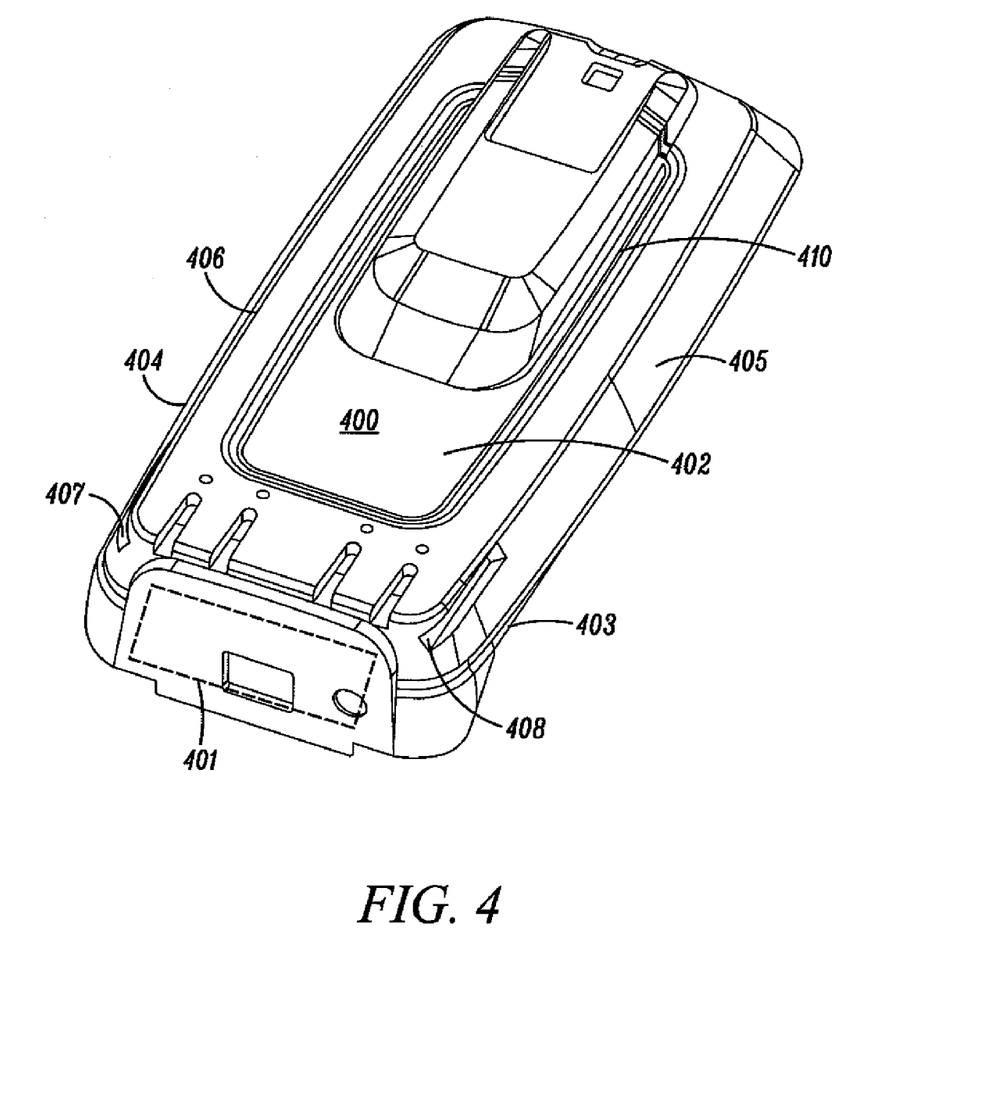
FIG. 4 illustrates a perspective view of one preferred embodiment of a battery pack with an improved battery retention system in accordance with the invention.

The battery retention system of the charger of this invention is suitable for use with a battery pack having non-orthogonal slots, as is recited in commonly assigned, copending application entitled "Battery Pack Having Non-Orthogonal Coupling Slots", filed May 5, 2005, Ser. No. 11/122915. Turning now to FIG. 4, illustrated therein is such a battery pack 400. The battery pack 400, which includes major surfaces or faces, and intersection seams where these faces meet, has a generally rectangular cross section as is represented by dashed line 401.

The battery pack 400 includes four major faces and four intersection seams. As can be seen from the perspective view of FIG. 4, face 402 is one major face, face 403 is a second major face, face 404 is a third major face, and a face opposite face 402 would comprise a fourth major face. Edge 405 and edge 406 are examples of intersection seams which are created by the intersection of the major faces 402-404. By way of example, intersection seam 405 is formed at the intersection of major face 402 and major face 403. The battery pack may also include various indentions 410 as well.

In the exemplary embodiment of FIG. 4, a pair of female slots 407, 408 are disposed along the exterior battery housing. In this particular embodiment, the pair of female slots 407, 408 are disposed along intersection seams 406 and 405, respectfully. It will be clear to one of ordinary skill in the art having the benefit of this disclosure, however, that the invention is not so limited. For instance, the pair of female slots 407, 408 could be disposed along a single face, like that of major face 402. Additionally, the pair of female slots 407, 408 could be disposed along opposing major faces, for example major face 404 and major face 403.

Depending upon where the female slots 407,408 are located, various housing elements will provide separation between the slots 407,408. For example, turning again to the exemplary embodiment of FIG. 4, female slot 407 is disposed along intersection seam 406 as noted in the preceding paragraph. Similarly, female slot 408 is disposed along intersection seam 405. As such, intersection seam 406 is separated from intersection seam 405 by major face 402. Note that if the pair of female slots 407, 408 was disposed on adjacent major faces, for example major face 404 and major face 402, the female slots 407 and 408 would then be separated by an intersection seam, like intersection seam 406 for instance. Similarly, if the pair of female slots 407, 408 was disposed on opposing major faces, like major face 404 and major face 403, the pair of female slots 407, 408 would then be separated by a major face 402 and two intersection seams 406, 405.

As shown in the embodiment of FIG. 4, the pair of female slots 407, 408 project inward from the exterior housing at an angle that is oblique to any major face of the generally rectangular cross section. By way of example, female slot 408 projects at an angle towards the center of the rectangle indicated by dashed line 401, such that the angle of projection of female slot 408 is oblique with either major face 400 or major face 403. Similarly, female slot 407 projects inward at an angle that is oblique to either major face 402 or major face 404. In one preferred embodiment the female slots 407, 408 project inward at an angle of between 30 and 60 degrees from major face 402. It is this oblique projection into the battery pack that allows the battery retention system of the present invention to facilitate multiple battery sizes in a single charger pocket without compromising the charger contact to battery contact connection.

Figure 5:
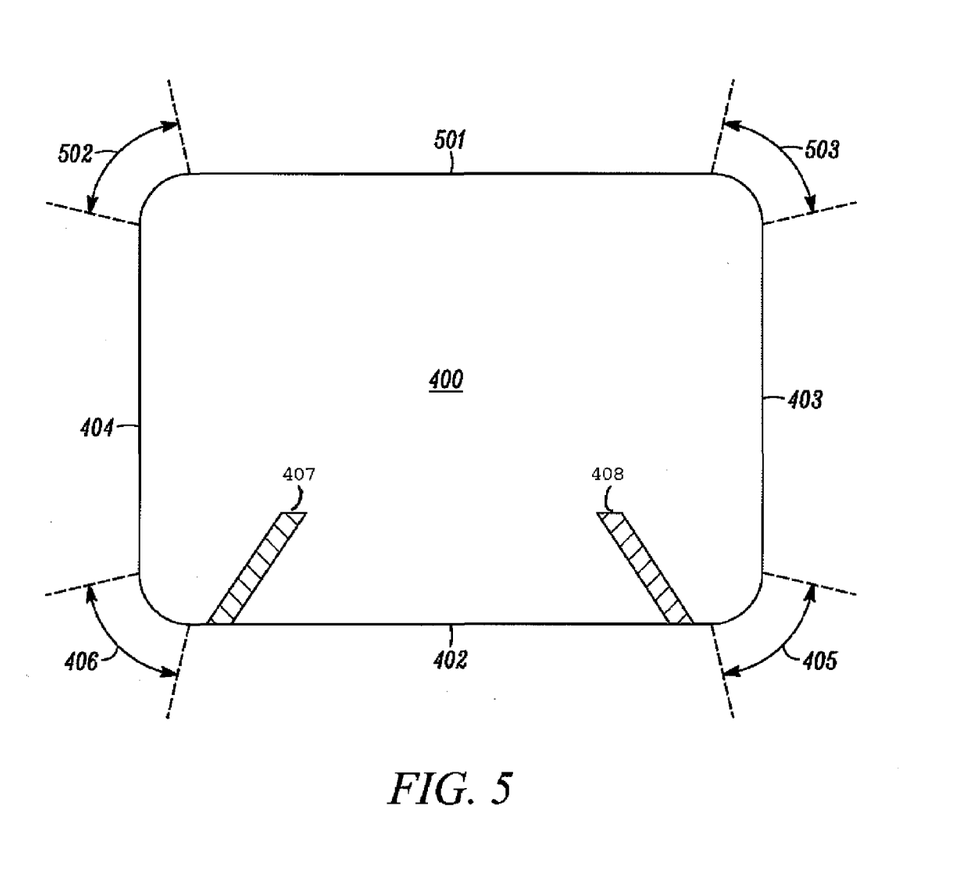
FIG. 5 illustrates one preferred embodiment of a battery pack having an improved battery retention system in accordance with the invention.

Turning now to FIG. 5, illustrated therein is a cross-sectional view of the battery pack 400. In this sectional view, the four major faces 402, 403, 404, 501 may be seen. Additionally, the four intersection seams 405, 406, 502, 503 may also be seen. Note that the intersection seams 405, 406, 502, 503, as illustrated, may be curved corners between the major faces 402, 403, 404, 501. The intersection seams may alternatively be straight lines, convex indentions, complex curvatures or multi-segmented steps running from one major face to the next. Note as well that any of the major faces may include, for example, chamfers thereby making them curved as opposed to substantially straight.

In the embodiment of FIG. 5, female slot 407 is disposed along intersection seam 406, while female slot 408 is disposed along intersection seam 405. In this embodiment, as illustrated, female slot 407 is separated from female slot 408 by major face 402. As can be seen, female slots 407, 408 project inward from an outer surface (major face 402) on the exterior of the battery 400 at an angle that is oblique to either the major faces 402, 403, 404, 501 or the intersection seams 405, 406, 502, 503. Specifically, in the embodiment of FIG. 5, the female slots 407, 408 project inward at an angle that is oblique to major face 402. In one preferred embodiment, female slots 407, 408 project inward at an angle between 30 and 60 degrees relative to major face 402.

Figure 7:
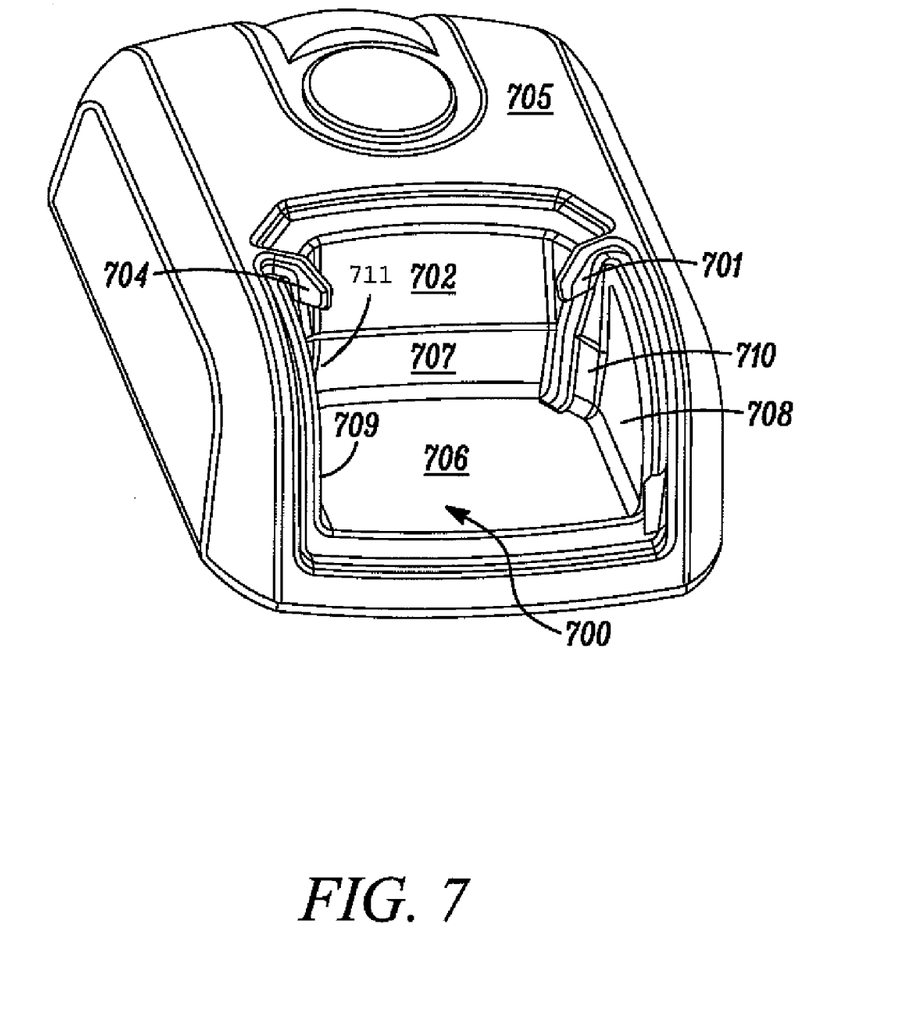
FIG. 7 illustrates one embodiment of a charger for accommodating battery packs having an improved battery retention system in accordance with the invention.

Turning now to FIG. 7, illustrated therein is one preferred embodiment of a desktop charger 705 having an improved battery retention system in accordance with the invention. The charger 705, which may be manufactured of plastic by way of an injection molding process, includes a pocket 700 having a bottom 706 and sidewalls 707-709. The pocket bottom 706 may be substantially horizontal when the charger 705 is placed on a horizontal object, like a desktop. The sidewalls 707-709 extend vertically in a substantially orthogonal fashion from the pocket bottom 706. In this particular embodiment, the rear sidewall has been sectioned into a substantially vertical sidewall 707 and a "back" 702, which has been angled with respect to sidewall 707 so as to make battery insertion into the pocket 700 easier. When inserted into the pocket 700, a battery slides along the back 702 and sidewall 707 until the base of the battery reaches the bottom 706 of the pocket 700.

In accordance with the invention, the pocket 700 includes oblique battery engagement rails 701,704 for mating with the pair of female slots disposed within the exterior housing of the battery pack. The oblique battery engagement rails 701,704, which may be located either in corners 710,711, as is shown in FIG. 4, or along any of the sidewalls 707-709, are oblique with respect to at least one of the sidewalls 707-709.

The oblique angle of the battery engagement rails 701,704 (with respect to the sidewalls 707-709) ensures the battery will be retained in the pocket 700 during the charging process. This is due to the fact that the oblique angle serves to resist any lateral forces that may be exerted on the battery while in the pocket 700. Electrical contacts (not shown in this view) which may be disposed along any of the sidewalls 707-709, will be held reliably in contact with the charging contacts of the battery as a result of the coupling of the battery engagement rails 701,704 with the pair of female slots disposed in the battery pack.

While in FIG. 7 the battery engagement rails 701,704 are disposed in the corners corner regions 710-711 where the sidewalls 707-709 intersect, the invention is not so limited. It will be clear to those of ordinary skill in the art having the benefit of this disclosure that the battery engagement rails 701,704 could equally be located at other locations within the pocket 700. For example, both battery engagement rails 701,704 may be disposed along a single sidewall. Similarly, a first battery engagement rail, e.g. battery engagement rail 701, may be disposed along a first sidewall, e.g. sidewall 709, while a second battery engagement rail, e.g. battery engagement rail 704, may be disposed along a second sidewall, e.g. sidewall 709.

Figure 8:
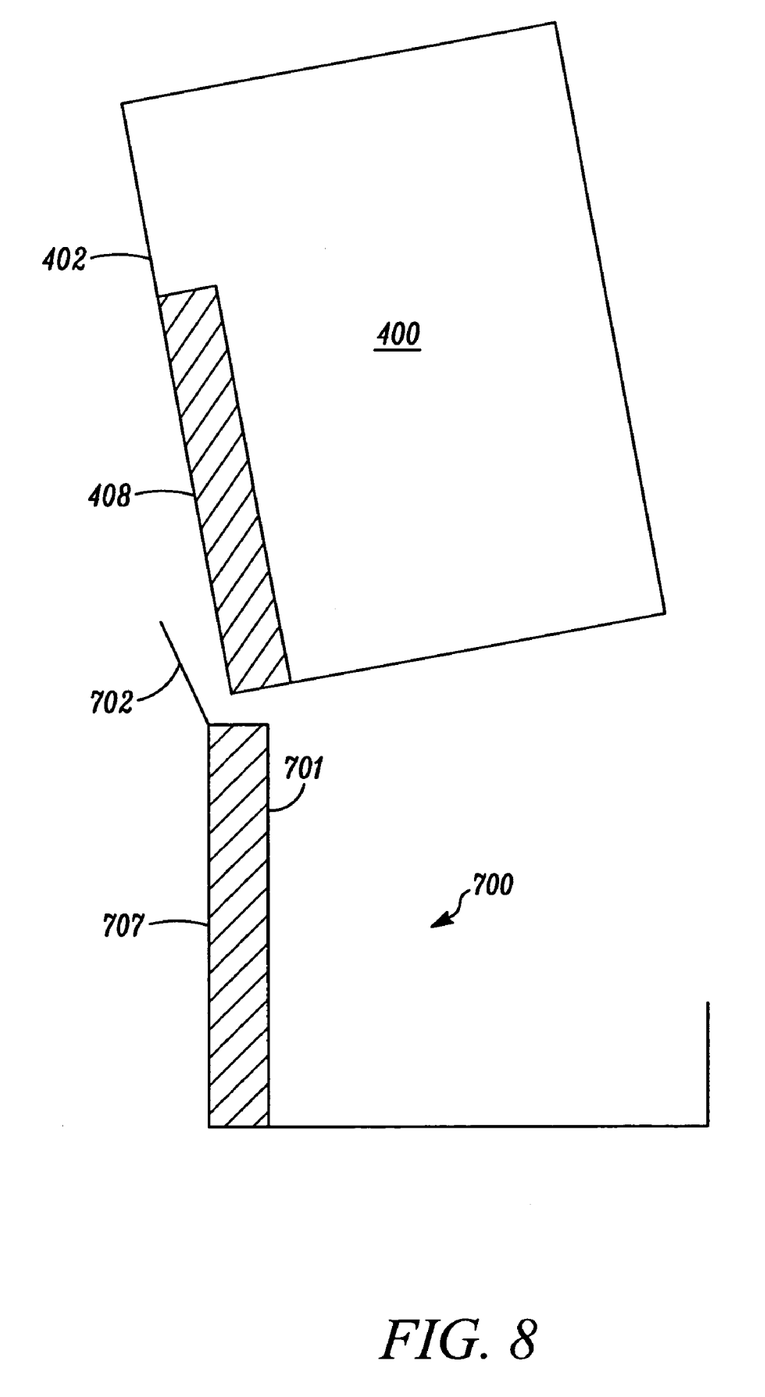
FIG. 8 the side view of a battery pocket and battery pack having an improved battery retention system in accordance with the invention.

Turning now to FIG. 8 illustrated therein is a side view of a battery pack 400 in accordance with the invention being inserted into a charger pocket 700. Note that the oblique battery engagement rails 701 mate with the oblique female slots 408 when the battery pack 400 slides into the pocket 700. As such, the back of the battery pack 400, represented by major face 402, rests against either the back 702 of the charger pocket 700 or sidewall 707 when the battery pack 400 is inserted in the pocket 700. The oblique battery engagement rails 701 and slots 408 enable any battery pack, regardless of size, to securely fit and be held within the pocket 700. Since the back of the battery 402 is held against the back components 702, 707 of the pocket 700 regardless of battery size, no gaps or other misalignments will cause intermittent electrical connections between electrical contacts in the pockets 700 and charging contacts disposed on the battery pack 400.

Figure 6:
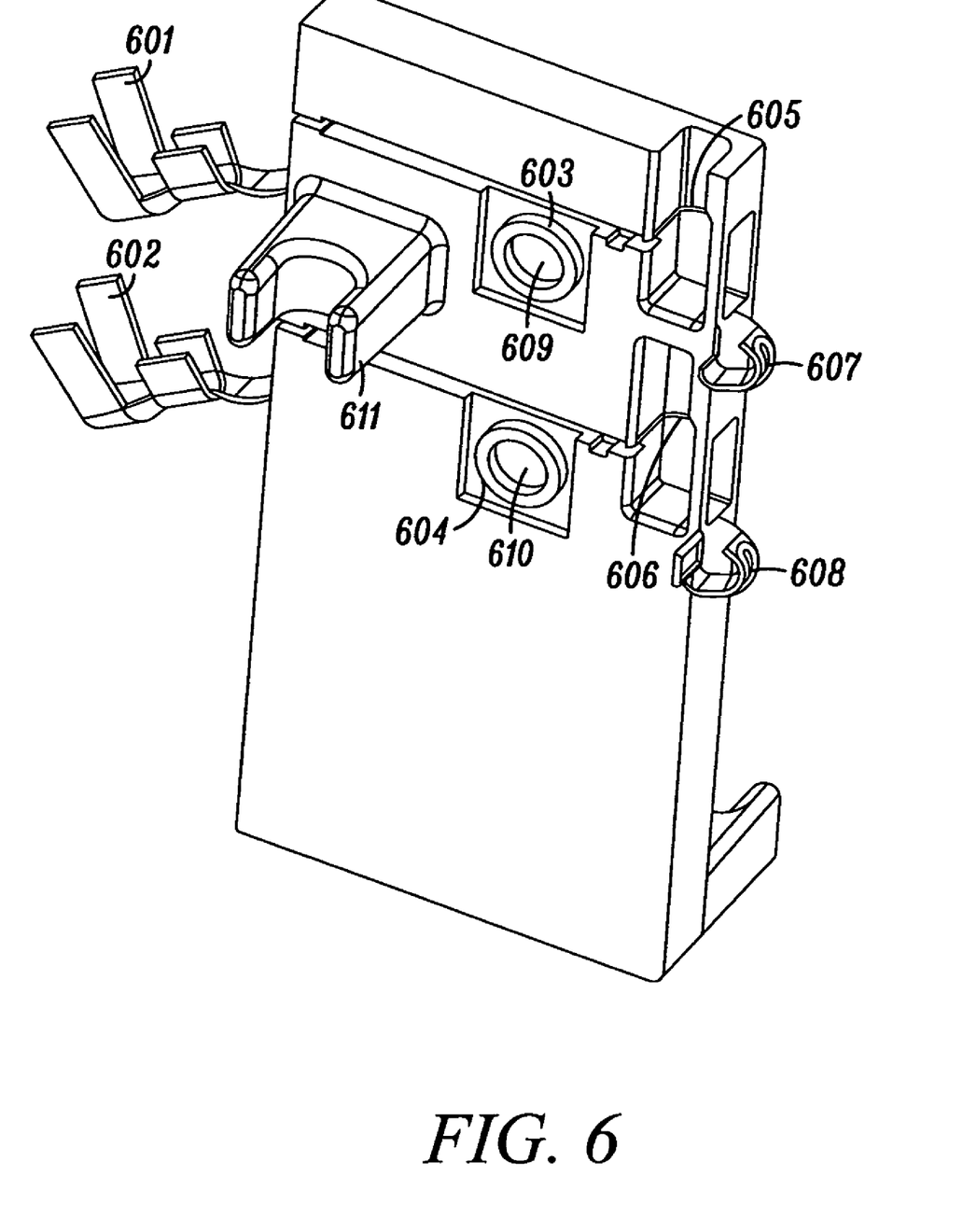
FIG. 6 illustrates a battery engagement rail having embedded electrical contacts in accordance with the invention.

As noted above, the electrical contacts in the charger pocket may be physically separate from the battery engagement rails. For example, they may be disposed along one of the sidewalls, while the battery engagement rails may be disposed within the corner regions. In another preferred embodiment, however, the electrical contacts may be disposed within the battery engagement rails themselves. Turning now to FIG. 6, illustrated therein is such an embodiment.

In FIG. 6, a pair of electrical contacts 601,602 is disposed within a battery engagement rail 600. The pair of electrical contacts 601,602 may be placed into grooves that were formed during the molding process of the battery engagement rail 600. The pair of electrical contacts 601,602 may be permanently coupled to the battery engagement rail 600 in a variety of methods. In addition to insert molding, gluing, screwing, riveting or press fitting, a designer may include attachment mechanisms 603,604 which may be heat staked (by melting a plastic boss 609,610 that passes through the attachment mechanisms 603,604) such that the pair of electrical contacts is affixed to the battery engagement rail. Spring loops 605,606 or other resilient devices may be included to ensure that the electrical prongs 607,608 deflect when the battery pack housing passes across them. A coupling mechanism 611 may also be included to attach the battery engagement rail 600 to the charger housing.

Figure 9:
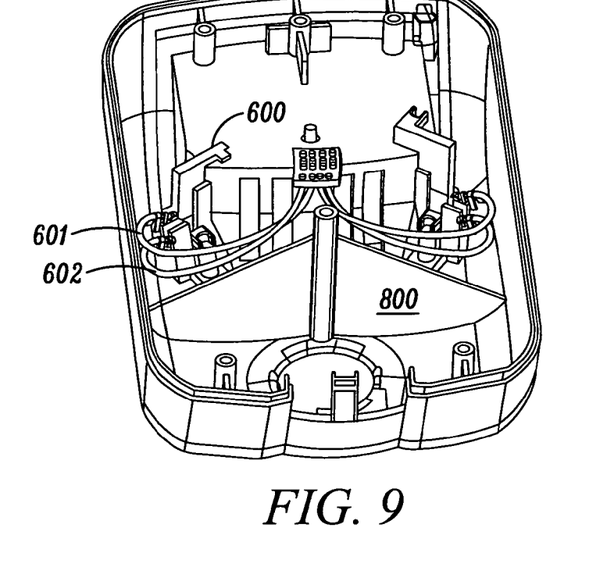
FIG. 9 illustrates a charger housing having the battery engagement rails of FIG. 6 in accordance with the invention.
Figure 10:
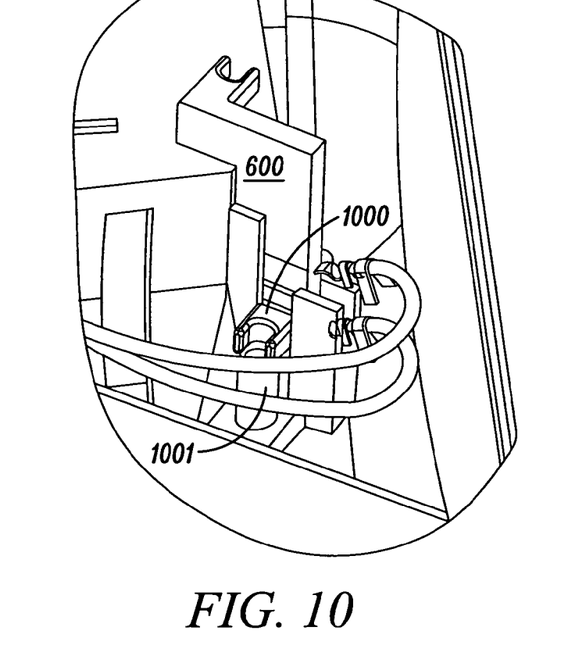
FIG. 10 illustrates a view of a battery engagement rail seated in a charger housing in accordance with the invention.

Turning now to FIG. 9, illustrated therein is the battery engagement rail 600 of FIG. 6 inserted into a charger housing 900. The battery engagement rail 600 includes electrical contacts 601,602 that may be coupled to the electrical circuitry disposed within the charger. The battery engagement rail 600 may be coupled to the charger housing 800 in a variety of ways. For example the battery engagement rail 600 may be simply glued in place with a suitable adhesive. It may also be sonically welded or heat staked to the housing as well. In one preferred embodiment, the battery engagement rail 600 may even be in two pieces, with one half having the electrical contacts 601,602, while another half, molded into the housing 800, sits atop. As can be seen in FIG. 10, the battery engagement rail 600 may include a snap and retention feature 1000 that mates with a retention post 1001 in the battery housing to help ensure that the battery engagement rail 600 stays in place.

To summarize the invention, a desktop battery charger having a pocket for receiving a rechargeable battery pack is provided. The pocket is equipped with a battery retention system to ensure that a reliable and consistent connection between the battery pack and the charger exists. The pocket includes a bottom member for supporting the rechargeable battery pack when inserted into the pocket and at least one sidewall extending substantially orthogonally from the bottom member. There are at least two coupling rails for engaging the rechargeable battery pack. The coupling rails run contiguously with the at least one sidewall and extend away from the at least one sidewall at a oblique angle. Electrical contacts, capable of supplying voltage and current to the rechargeable battery pack, are included as well.

The coupling rails may be disposed in a variety of locations within the pocket. For example, the coupling rails may be disposed along one sidewall. The coupling rails may also be placed on different sidewalls. Explained differently, a first coupling rail may be disposed along a first sidewall, while a second coupling rail may be disposed along a second sidewall.

Similarly, where the pocket has three sidewalls, two corner regions will exist where the three sidewalls intersect. In such an embodiment, the coupling rails may be disposed within the corner regions. For example, a first coupling rail may be disposed along a first corner region, while a second coupling rail may be disposed along a second corner region. Electrical contacts, which may be physically separate from the coupling rails, may be included within the coupling rails to provide a "hidden" electrical connection.

Embedding the electrical contacts within the coupling rails offers numerous advantages over prior art charging systems. A first advantage is improved battery aesthetics. Since the electrical contacts are hidden when the battery is inserted into the pocket, they are not easily seen by the user.

Additionally, when the coupling rails are physically separate, for instance when they are disposed within the corner regions of the pocket, additional separation between the contacts is provided. This additional isolation prevents, for example, salt and other impurities found in the air from creating corrosive bridges between the contacts.

While the preferred embodiments of the invention have been illustrated and described, it is clear that the invention is not so limited. Numerous modifications, changes, variations, substitutions, and equivalents will occur to those skilled in the art without departing from the spirit and scope of the present invention as defined by the following claims.

What is claimed is:

1. A charger capable of providing voltage and current to a rechargeable battery pack, comprising:
   a. at least one pocket in the charger for accommodating the rechargeable battery pack, the pocket comprising:
      i. a pocket bottom;
      ii. at least opposing parallel sidewalls;
      iii. a pair of non-conductive battery engagement rails accommodating the battery pack, each battery engagement rail connected to a portion of the sidewall, the battery engagement rails connected to the sidewalls in a fixed, non-retractable manner parallel with the opposing sidewall and extending obliquely outward from the sidewalls such that a plane containing a centerline of the battery engagement rail is oblique to a plane containing the sidewall to which the battery engagement rail is connected where the battery engagement rail is connected the sidewall; and
      iv. electrical contacts and
   b. electrical circuitry in the charger coupled to the electrical contacts for charging the rechargeable battery pack.

2. The charger of claim 1, wherein the pair of battery engagement rails are disposed along one of the sidewalls.

3. The charger of claim 1, wherein a first battery engagement rail is disposed along a first sidewall, further wherein a second battery engagement rail is disposed along a second sidewall.

4. The charger of claim 1, wherein the pocket bottom is substantially horizontal.

5. The charger of claim 1, wherein the electrical contacts are physically separate from the pair of battery engagement rails.

6. The charger of claim 1, wherein the electrical contacts are disposed within the pair of battery engagement rails.

7. The charger of claim 1, wherein the battery engagement rails extend outward from the at least one of the sidewalls at an angle of between 30 and 60 degrees from the sidewalls.

8. A desktop battery charger having a pocket for receiving a rechargeable battery pack, wherein the pocket comprises:
   a. a bottom member in the charger for supporting the rechargeable battery pack when inserted into the pocket;
   b. at least one sidewall in the charger extending substantially orthogonally from the bottom member;
   c. at least two non-conductive coupling rails in the charger for engaging the rechargeable battery pack, the at least two coupling rails running contiguously with the at least one sidewall and extending away from the at least one sidewall at an oblique angle, the coupling rails configured to couple with slots in the battery pack such that the battery pack is restrained from moving along the at least one sidewall, the coupling rails connected to the at least one sidewall in a fixed, non-retractable manner; and
   d. electrical contacts in the charger capable of supplying voltage and current to the rechargeable battery pack.

9. The charger of claim 8, wherein the at least two coupling rails are disposed along one of the at least one sidewall.

10. The charger of claim 8, wherein a first of the at least two coupling rails is disposed along a first sidewall, further wherein a second of the at least two coupling rails is disposed along a second sidewall.

11. The charger of claim 8, wherein the pocket comprises at least three sidewalls, wherein the pocket further comprises at least two corner regions where the at least three sidewalls intersect.

12. The charger of claim 11, wherein a first coupling rail is disposed along a first corner region, further wherein a second coupling rail is disposed along a second corner region.

13. The charger of claim 8, wherein the pocket bottom is substantially horizontal.

14. The charger of claim 8, wherein the electrical contacts are physically separate from the at least two of coupling rails.

15. The charger of claim 8, wherein the electrical contacts are disposed within the at least two coupling rails.

16. The charger of claim 8, wherein the coupling rails extend from the at least one sidewall such that the coupling rails extend outward at an angle of between 30 and 60 degrees from the at least one sidewall.

17. A charger capable of providing voltage and current to a rechargeable battery pack, comprising:
   a. at least one pocket in the charger for accommodating the rechargeable battery pack, the pocket comprising:
      i. a pocket bottom;
      ii. opposing parallel sidewalls
      iii. a connecting sidewall disposed between and perpendicular to the opposing sidewalls;
      iv. corner regions connecting the opposing sidewalls with the connecting sidewall;
      v. non-conductive battery engagement rails accommodating the battery pack and extending outward from the corner regions such that the rails are oblique with the opposing sidewalls and the connecting sidewall, the battery engagement rails configured to couple with slots in the battery pack such that the battery pack is restrained from moving along the opposing sidewalls and the connecting sidewall, the battery engagement rails connected to corner regions in a fixed, non-retractable manner; and
      vi. electrical contacts; and
   b. electrical circuitry in the charger coupled to the electrical contacts for charging the rechargeable battery pack.

18. The charger of claim 17, wherein the electrical contacts are physically separate from the pair of battery engagement rails.

19. The charger of claim 17, wherein the electrical contacts are disposed within the pair of battery engagement rails.

20. The charger of claim 17, wherein the rails extend outward at an angle of between 30 and 60 degrees from each sidewall.

* * * * *